United States Patent [19]

Tsakiris et al.

[11] Patent Number: 5,563,630
[45] Date of Patent: Oct. 8, 1996

[54] COMPUTER MOUSE

[75] Inventors: Alex L. Tsakiris, Dallas, Tex.; David R. Lawson, South Portland, Me.; Martin H. Phillips, Dallas, Tex.

[73] Assignee: Mind Path Technologies, Inc., Dallas, Tex.

[21] Appl. No.: 391,294

[22] Filed: Feb. 21, 1995

Related U.S. Application Data

[63] Continuation of Ser. No. 141,949, Oct. 28, 1993, abandoned.

[51] Int. Cl.⁶ ..................................................... G09G 3/02
[52] U.S. Cl. ......................... 345/160; 345/158; 345/169
[58] Field of Search .................................... 345/163, 156, 345/157, 158, 160, 169, 168; 273/148 B; 200/5 R, 5 E, 6 R; 341/22; 348/734

[56] References Cited

U.S. PATENT DOCUMENTS

| | | | |
|---|---|---|---|
| 3,745,536 | 7/1973 | Klehm, Jr. | 345/163 |
| 4,680,577 | 7/1987 | Straayer et al. | 345/168 |
| 4,687,200 | 8/1987 | Shirai | 273/148 B |
| 4,769,517 | 9/1988 | Swinney | 345/161 |
| 4,945,357 | 7/1990 | Tal | 345/161 |
| 5,065,146 | 11/1991 | Garrett | 273/148 B |

FOREIGN PATENT DOCUMENTS

| | | |
|---|---|---|
| 0390041 | 10/1990 | European Pat. Off. ............... 345/169 |
| 0502222 | 9/1992 | European Pat. Off. . |
| 9113744 | 1/1992 | Germany . |
| 9202533 | 4/1992 | Germany . |
| 2178856 | 2/1987 | United Kingdom . |
| 92/12437 | 7/1992 | WIPO . |

OTHER PUBLICATIONS

"An Interactive Menu–Driven Remote Control Unit for TV–Receivers and VCR–Recorders" Günter Zeisel IEEE 1988.
"Smart Key" IBM Technical Disclosure Bulletin vol. 28 No.5 Oct. 1985.
O. Lefort, "A Miniature Low Cost Silicon Micromachined Servo Accelerometer", Symposium Gyro Technology, 1988, Stuttgart, Germany.

*Primary Examiner*—Raymond J. Bayerl
*Assistant Examiner*—Doon Chow
*Attorney, Agent, or Firm*—Gregory W. Carr

[57] ABSTRACT

The present invention includes a remote mouse controller having a disc controller actuable by a user for the infrared remote signalling of all common mouse functional operations. Depression along the edge of the disc controller signals cursor movement and direction operations. Depression in the center of the disc controller signals selection of certain operational features such as the mouse "click", "double click" and "click-and-drag" operations. A plurality of user actuable fixed function and programmable function keys are also provided to facilitate user selection and input of keyboard type data.

23 Claims, 3 Drawing Sheets

COMPUTER MOUSE

This is a continuation of application Ser. No. 08/141,949 filed Oct. 28, 1993, now abandoned.

TECHNICAL FIELD

The present invention relates to computer input devices and, in particular, to a computer mouse input device.

BACKGROUND OF THE INVENTION

There are a variety of known computer input devices. The most popular and commonly used computer input device is the keyboard. The recent development and increased use of graphical user interface products, however, have served to highlight the inherent limitations of the conventional computer keyboard as an input device. For example, the conventional keyboard is designed primarily for textual input and allows control of-cursor movement in only a limited number of directions and at a fixed speed. Unfortunately, data input and cursor control of such a limited nature often fails to take full advantage of the wide range of graphical functions provided in current graphical user interface products and thus frustrates the efficient and effective use of such products.

The functional and operational limitations of the conventional keyboard as a computer input device led to the development of alternative, more graphically oriented and user friendly computer input devices such as the joystick, mouse and trackball. Such alternative input devices require less direct attention, for example, eye contact, thus allowing the user to concentrate on the computer screen and the task at hand. These devices are specially designed to facilitate precision cursor movements, at varying speeds, and in virtually any desired direction, thus allowing the user to easily take full advantage of the enhanced graphical functions provided in current graphical user interface products.

However, common graphically oriented computer input devices typically retain an important keyboard limitation; the input devices are tied to the computer by means of a cable and thus do not allow the computer user freedom of movement while simultaneously operating the computer. Such movement is most often necessary when the computer is being utilized for a group presentation, such as in training, business presentation, entertainment and demonstration purposes. Such flexibility and convenience in controlling the operation of the computer is not possible with current tethered computer input devices.

SUMMARY OF THE INVENTION

The present invention comprises a computer controller with a disc-shaped actuator responsive to user depression for signalling operational feature selections, for example, all common mouse functional operations related to graphical computer data input. The computer controller includes a plurality of actuable switches positioned about the perimeter of the disc actuator. The perimeter switches are actuated in response to depression of the circumferential edge of the disc actuator by the user for signalling, for example, cursor movement and direction. The controller further includes an actuable switch positioned at the center of the disc actuator. The center switch functions as a fulcrum point on which the disc actuator may be rocked in actuating the perimeter switches, and when actuated by depressing the center of the disc actuator further functions for signalling, for example, mouse "click", "double click" and "click-and-drag" operations. The computer controller of the present invention further includes a plurality of fixed function and programmable function keys with which the user may select and input via the controller certain keyboard type data. An infrared transmitter is provided for remotely signalling the user selected functions and operations and keyboard type data to a computer for execution and entry.

BRIEF DESCRIPTION OF THE DRAWINGS

A more complete understanding of the computer mouse of the present invention may be had by reference to the following Detailed Description when taken in conjunction with the accompanying Drawings wherein.

DETAILED DESCRIPTION OF THE DRAWINGS

Figure 1:
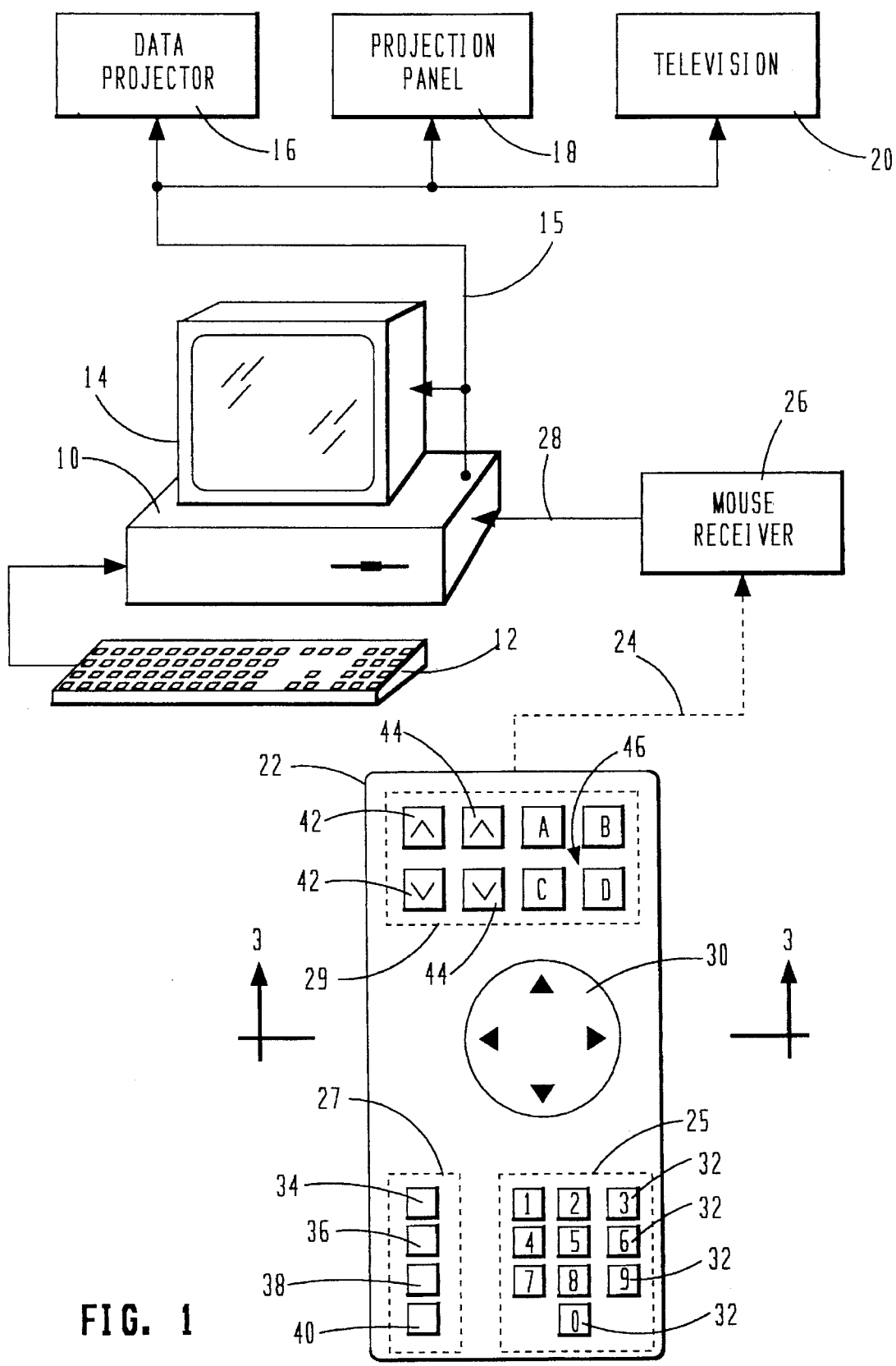
FIG. 1 is a schematic diagram of a computer presentation system.

Referring now to FIG. 1, there is shown a schematic diagram of a computer presentation system including a personal computer 10 with a keyboard input device 12 and a CRT display 14. Although the display 14 is the primary means for the computer 10 to visually present information, the connection (via line 15) of a data projector 16, projection panel 18 or big screen television 20 to the computer, if desired, may provide a more appropriate vehicle for effectively displaying computer generated information in a group presentation situation. The computer 10 is preferably controlled by a presenter (user) by means of a remote mouse 22 of the present invention. The remote mouse 22 transmits control signals for operating the computer 10 via an infrared communications link 24. An infrared mouse receiver 26 connected to the computer via line 28 is provided to receive the transmitted infrared control signals.

The remote mouse 22 includes a number of presenter actuable keys for remotely controlling the functional operation of, and selecting operational features provided by the computer 10 during a group presentation situation. These actuable keys include numerical input keys 25, a first and second set of function input keys 27 and 29, respectively, and a disc controller 30.

The numerical keys 25 include one key 32 for each of the numerals from zero through nine. Selection of one or more numerical keys 25 may be used in one instance to enter numbers for display during a presentation. For example, the user may input numbers during a mathematics or accounting presentation. In another instance, the selection of one or more numerical keys 25 will initiate a certain presenter-selected computer function associated with the selected number. For example, the computer may respond to the input of a particular number by executing a previously loaded applications program or routine.

The first set of function input keys 27 includes an "enter" key 34, a "menu" key 36, a "pause" key 38 and an "escape" key 40, thus providing for presenter actuation several of the function keys that are commonly found on a standard keyboard computer input device 12. The second set of function input keys 29 includes keys 42 for controlling "contrast" and keys 44 for controlling "level" (brightness) of the images displayed on the preferred display device (CRT 14, data projector 16, projection panel 18 or television 20). The function keys 29 further include a set of special user programmable keys 46 (identified by the letters "A" through "D") that may be actuated by the presenter to initiate certain external device functions or operations.

The disc controller 30 is actuable in at least two ways. In the first type of actuation, the disc controller 30 is rocked in a selected direction by applying pressure to the edge of the disc with the presenter's thumb to direct certain computer operations such as control the movement and positioning (direction and speed) of the computer generated cursor on the display (14, 16, 18 or 20). In the second type of actuation, the disc controller 30 is depressed by applying pressure to the center of the disc with the presenter's thumb to select certain computer operational features such as the initiation of the computer mouse "click", "double click" and "click and drag" functions that are well known to those skilled in the art.

The hardware for facilitating such mouse operation will be described in detail with respect to FIGS. 2 and 3. The software or firmware within the computer 10 for implementing these functions is well known in the art and will not be described herein.

Figure 2:
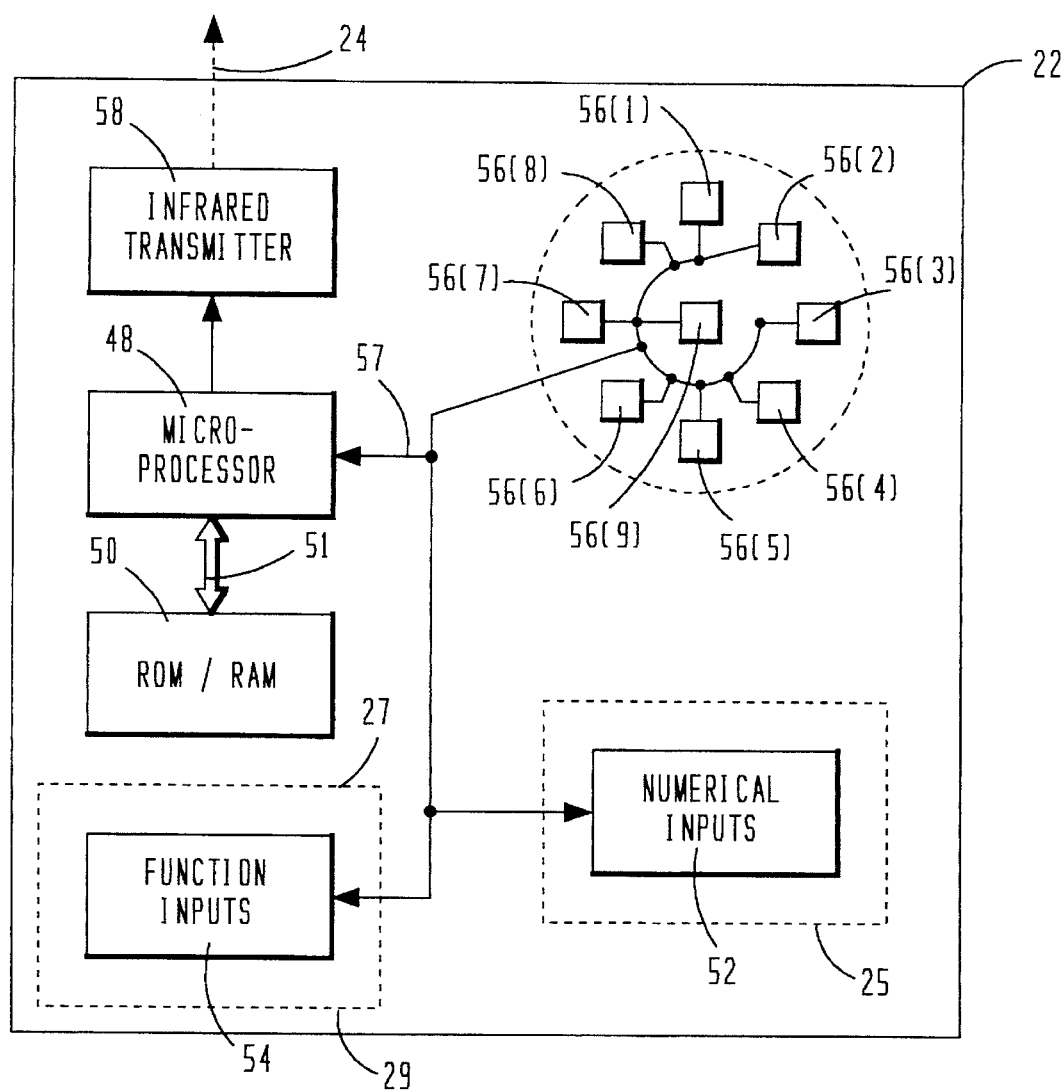
FIG. 2 is a schematic diagram of the remote mouse controller of the present invention.

Reference is now made to FIG. 2 wherein there is shown a schematic diagram of the remote mouse controller 22 of the present invention including a microprocessor 48, a RAM/ROM storage area 50, numerical inputs 52 (responsive to depression of the numerical keys 25), function inputs 54 (responsive to depression of the function keys 27 and 29), disc switches 56 (responsive to the depression of the disc controller 30), and an infrared transmitter 58. The RAM/ROM storage area 50 is coupled to the microprocessor 48 via bus 51 and provides a temporary data storage area and also a permanent storage area for the program executed by the microprocessor to operate the remote mouse 22. The disc switches 56 include a plurality of actuable switches 56(1) through 56(8) arranged in a circular array and positioned about the perimeter of the disc controller 30, and one actuable switch 56(9) positioned in the center of the disc controller. The switches 56(1) through 56(9), along with the numerical inputs 52 and function inputs 54, are connected to the microprocessor 48 via a bus 57.

In response to the depression of the numerical or functional keys 25, 27 or 29, the microprocessor will sense the actuation of the inputs 52 or 54, respectively, and, in accordance with its program and a look-up table stored in the RAM/ROM storage area, format a message in a manner well known in the art for transmission to the computer 10. The formatted message is output from the microprocessor 48 via line 60 to the infrared transmitter 58 where the digital data signal is converted into an infrared data signal for output over infrared link 24. The infrared signal generated in response to depression of the function keys 29 is processed by other devices, like the displays 16, 18 and 20, to control device operation, rather than by the receiver 26 and computer 10 to control computer operation. At the computer 10, the operating system processes the received infrared signal generated in response to depression of functional keys 27, numerical keys 25 and disc-controller 30, and implements the signalled function, operation or input.

The remote mouse 22 responds to the depression of the disc controller 30 and actuation of the switches 56(1) through 56(9) in a different manner than with actuation of the numerical and function inputs 52 and 54. Depression of the disc controller 30 about its edge causes one or more of the plurality of switches 56(1) through 56(8) to be actuated thereby directing a computer operation such as to control the movement (direction and speed) and thus position a computer generated cursor. In accordance with the program stored in the RAM/ROM storage area 50, the microprocessor 48 sequentially scans the actuable switches 56(1) through 56(8) positioned about the perimeter of the disc controller 30 in a clockwise, numerical order. If no switch 56(1) through 56(8) has been actuated, no data signal is generated for infrared transmission. If one perimeter switch 56(1) through 56(8) has been actuated, a data signal including the data code for the actuated switch paired with a null character is generated for infrared transmission. For example, with sole actuation of perimeter switch 56(2), the data signal would comprise the data pair [2,0] consisting of the data code (2) for switch 56(2) paired with a null character (0). If two or more perimeter switches 56(1) through 56(8) have been actuated, a data signal including the paired data codes for the first two switches in each scan that are detected as being actuated is generated for infrared transmission. For example, with actuation of switches 56(5) and 56(6), the data signal would comprise the pair [5,6]. Conversely, with actuation of switches 56(4), 56(5) and 56(6), the data signal would only comprise the pair [4,5] with actuation of switch 56(6) being ignored.

Depression of the disc controller 30 in its center causes the center switch 56(9) to be actuated thereby selecting certain operational features such as the initiation of the computer mouse "click" "double click" and "click and drag", functions. In the preferred embodiment, the center switch 56(9) resists actuation unless depressed with a weight applied through the disc controller 30 of greater than 300–500 grams. This resistance to actuation prevents the center switch 56(9) from being inadvertently actuated when the presenter is purposefully actuating one of the perimeter switches 56(1) through 56(8) by pressing along the circumferential edge of the disc controller 30. The resistance to actuation also allows the center switch 56(9) to function, in a manner to be more fully described herein with respect to FIG. 3, as a fulcrum point about which the disc controller 30 is rocked by the user in actuating perimeter switches 56(1) through 56(8).

When the center switch 56(9) is actuated by depressing the center of the disc controller 30 with sufficient force, a data signal including the paired data code for the actuated center switch is generated for infrared transmission. For example, with actuation of center switch 56(9), the output data signal would comprise the data pair [9,9] consisting of the pairing of the data code (9) for center switch 56(9). As long as the center switch 56(9) is actuated, the actuation of any one or more of the perimeter switches 56(1) through 56(8) will be ignored by the microprocessor 48, and will not affect the continued transmission of the data pair [9,9].

With respect to the formatting of the transmission of data following a depression of the disc controller 30, in accordance with the present invention, specially paired characters are transmitted to identify the beginning and end of a disc controller initiated transmission. In the preferred embodiment, the character pair [M,M] is transmitted at the front end of a disc controller initiated transmission, and the character pair [U,U] is transmitted at the rear end of the transmission. The paired data codes [x,y] output in response to the actuation of switches 56(1) through 56(9) are transmitted between the character pairs [M,M] and [U,U] for a repeated number of times that is directly proportional to the length of time the particular switch or switches are held by the disc controller 30 in the actuated position.

In order to facilitate the selection of certain operational features (such as the standard mouse operations of "click", "double click" and "click and drag"), the computer 10 receives and interprets the transmitted infrared signals in accordance with a predetermined protocol. As discussed above, when the center switch 56(9) is depressed the remote mouse 22 will transmit the data pair [M,M] indicating the beginning of a disc controller 30 initiated transmission, followed by the repeated transmission of the center switch data pair [9,9] for a number of times directly proportional to the length of time the center switch 56(9) is held by the disc controller 30 in the actuated position, followed thereafter with the release of the disc controller 30 by the transmission of the data pair [U,U] indicating the end of a disc controller 30 initiated transmission. The repeated transmission of fewer than a predetermined number of center switch data pairs [9,9] indicates a single mouse "click". An immediate subsequent transmission of fewer than the predetermined number of center switch data pairs [9,9] indicates a double mouse "click". Conversely, the repeated transmission of greater than the predetermined number of center switch data pairs [9,9] indicates a mouse "click-drag-lock", after which time switches 56(1) through 56(8) may be actuated by the disc controller 30 to directionally drag the cursor in well known fashion. Any subsequent transmission of fewer than the predetermined number of center switch data pairs [9,9] indicates a mouse "click-drag-release" returning the mouse 22 to conventional operation.

At the computer 10, the transmitted infrared disc controller signal is received by receiver 26 and decoded to control computer operation.

The direction of cursor movement is controlled by the actuation of switches 56(1) through 56(8) in response to the edge depression of the disc controller 30. Further, the use of the data pair [x,y] signalling technique described above allows for the signalling of sixteen directions of cursor movement through the key sensing of eight switch actuations. If the data pair transmitted in response to depression of the disc controller 30 includes one data code corresponding to a switch actuation paired with one null character (for example, [x,0]), the computer 10 looks up the requested direction of movement corresponding to the data code from a look-up table and moves the cursor in the requested direction. For example, if only switch 56(1) (north) is actuated to transmit data pair [1,0], the cursor will be moved in a north direction. If the transmitted data pair includes two data codes corresponding to two different switch actuations (for example, ([x,y]), the direction of movement corresponding to each of the codes is averaged and the computer 10 moves the cursor in the requested direction. For example, if switches 56(1) (north) and 56(2) (north-east) are actuated to transmit data pair [1,2], the cursor will be moved in a north by north-east direction. In this manner, depression of the disc controller 30 will initiate up to sixteen different directions of cursor movement.

With respect to cursor speed, the number of consecutive identical data pairs transmitted to the computer 10 without interruption is counted by the computer 10 to determine the number of pixels the cursor is to be moved. The longer the switches 56(1) through 56(8) are actuated, the faster the cursor will move in the selected direction. For example, if three consecutive identical data pairs are received, the cursor is moved at a rate of one pixel per data pair. Further, if, for example, a predetermined number of consecutive identical data pairs (such as twenty) are received, the cursor will thereafter be moved more quickly at, for example, a rate of four pixels per data pair.

Figure 3:
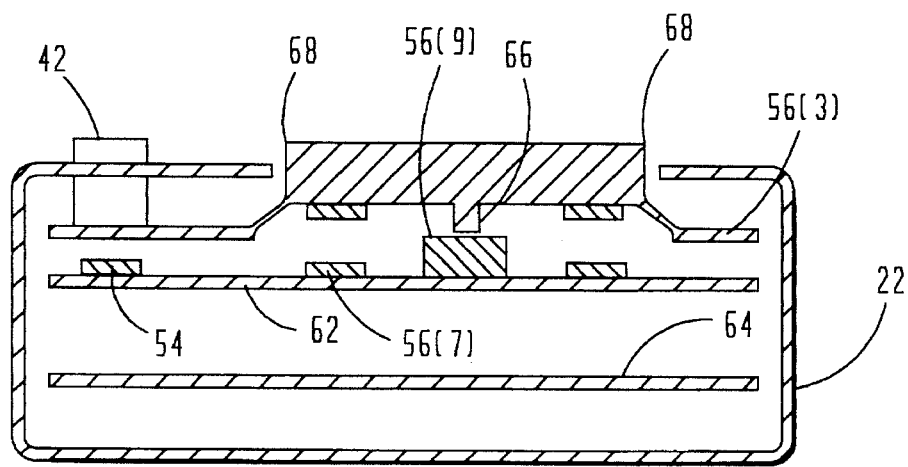
FIG. 3 is a cross-sectional view of the remote mouse controller of the present invention shown in FIG. 1.

Reference is now made to FIG. 3 wherein there is shown a cross-sectional view of the remote mouse 22 of the present invention including a switch circuit board 62 and a component circuit board 64. Mounted to the switch circuit board 62 are a plurality of switch contacts for the numerical inputs 52 (not shown), functional inputs 24 and 26 (not all shown) and disc inputs 56, including switches 56(3), 56(7) and 56(9) shown. Such switch contacts preferably comprise spaced apart conductors bridged and electrically connected to provide a switch actuation by a metalized pad on the underside of the depressed keys and/or disc controller. Mounted to the component circuit board 64 are the microprocessor 48, ROM/RAM 50 and infrared transmitter 58. At the center of the disc controller 30 is a dimple 66 that rests on the center switch 56(9) functioning as a fulcrum point about which the disc controller rocks when pressed on its edge 68 to actuate switches 56(1) through 56(8). The dimple 66 further functions to actuate center switch 56(9) when the disc controller 30 is depressed in the middle with sufficient force.

Figure 4:
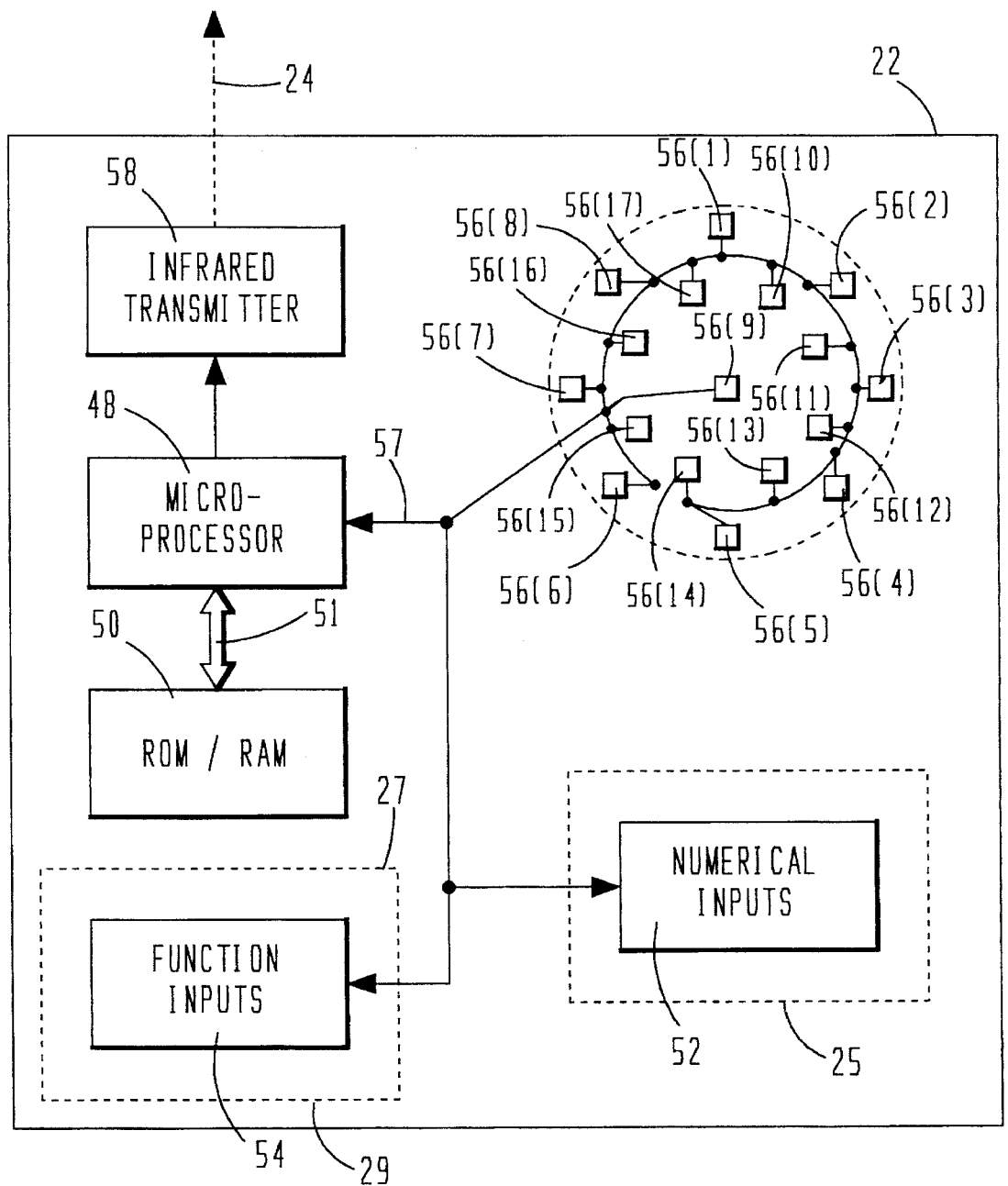
FIG. 4 is a schematic diagram of an alternate configuration for the remote mouse controller of the present invention.

An alternate schematic configuration for the mouse 22 is shown in FIG. 4. In this embodiment, the switches 56 include an outer set of perimeter switches 56(1) through 56(8) and a staggered inner set of perimeter switches 56(10) through 56(17). The outer and inner perimeter switches are arranged in concentric circular arrays. In operation, cursor speed is determined by switch actuation. Accordingly, a slight edge depression of the disc controller 30 will actuate only the inner perimeter switches 56(10) through 56(17) and signal a relatively slow rate of cursor movement. Conversely, a more substantial edge depression of the disc controller 30 will further actuate outer perimeter switches 56(1) through 56(8) and signal a quicker rate of cursor movement. As with the first embodiment of FIG. 2, actuation of center switch 56(9) will result in all other switch actuations being ignored. Further, the formatting of the data signal will be made, as in the prior embodiment, by sequential scanning of the perimeter switches (outer perimeter switches scanned first) and through processor use of a look-up table.

The mouse 22 of the present invention may be easily used in conjunction with interactive television systems or to control the operation of automated devices such as robots. The mouse 22 has particular applicability in controlling the operation of personal computers, for example in a business or medical environment. The mouse 22 further may be used in many other military or civilian applications where precise user actuated positioning and movement control is desired. Therefore, although an embodiment of the present invention has been illustrated in the accompanying Drawings and described in the foregoing Detailed Description, it will be understood that the invention is not limited to the embodiment disclosed, but may be modified without departing from the scope of the invention as set forth and defined by the following claims.

We claim:

1. A system controller, comprising:

a disc-shaped actuator having a circumferential edge, a center and a switch actuating member extending downward from the center, wherein the switch actuating member forms a fulcrum point about which the disc-shaped actuator rocks;

first switch means actuated in response to a depression of the disc-shaped actuator around its circumferential edge for generating cursor movement data wherein the disc-shaped actuator rocks about the fulcrum point to actuate the first switch means;

a second switch for generating cursor click data, the second switch positioned beneath the center of the disc-shaped actuator on which the fulcrum point of the switch actuating member of the disc-shaped actuator rests, the second switch being actuated by the downward movement of the switch actuating member forming the fulcrum point in response to a depression of the disc-shaped actuator at its center; and wherein the fulcrum point formed by the actuating member is supported by the second switch as the disc-shaped actuator is depressed about its circumferential edge, causing the disc-shaped actuator to rock the fulcrum point to actuate the first switch means.

2. The system controller as in claim 1 wherein the first switch means comprises a plurality of first switches arranged in a circular array about the edge of the disc-shaped actuator, and the second switch is positioned at the center of the circular array for actuation by the switch actuating member.

3. The system controller as in claim 2 wherein the first switch means further comprises a plurality of third switches arranged in a circular array concentric with the circular array of first switches.

4. The system controller as in claim 1 further including processor means connected to the first switch means and connected to the second switch for formatting a signal for output in response to first switch means and second switch actuation to control operation of the system.

5. The system controller as in claim 4 wherein the first switch means comprises a plurality of first switches and the processor means further includes means for sequentially scanning the plurality of first switches for actuation, the means for formatting including means responsive to each scan of the plurality of first switches for outputting a data pair for transmission comprising a data code for each of up to two first scanned actuated switches.

6. The system controller as in claim 4 wherein the processor means further includes means responsive to the actuation of the second switch for ignoring the actuation of the first switch means while the second switch remains actuated.

7. The system controller as in claim 4 further including a plurality of numerical keys and a plurality of numerical switches associated therewith, the processor means connected to the plurality of numerical switches and including means for formatting a signal in response to a depression of a numerical key and actuation of a numerical switch to transmit numerical data to a computer.

8. The system controller as in claim 4 further including a plurality of function keys and a plurality of function switches associated therewith, the processor means connected to the plurality of function switches and including means for formatting a signal in response to a depression of a function key and actuation of a function switch to transmit a selected function to a computer.

9. The system controller as in claim 4 further including an infrared transmitter connected to the processor means for remotely transmitting the signal to a computer.

10. The system controller as in claim 1 wherein the second switch has a predetermined resistance to actuation that inhibits inadvertent actuation of the second switch by the switch actuating member when the disc-shaped actuator is depressed around its circumferential edge.

11. A computer system, comprising:

computer means responsive to a control signal for moving a displayed cursor and selecting a computer operational feature;

a computer controller including a disc-shaped controller having a circumferential edge, a center with an actuating member extending therefrom wherein the actuating member forms a fulcrum point about which the disc-shaped controller rocks, first switch means positioned about and actuated by a depression of the edge of the disc-shaped controller wherein the disc-shaped controller rocks about the fulcrum point to actuate the first switch means, a second switch positioned beneath the center of the disc-shaped controller on which the fulcrum point formed by the actuating member of the disc-shaped controller rests, the second switch being actuated by the downward movement of the actuating member forming the fulcrum in response to a depression of the disc-shaped controller at its center, wherein the fulcrum point formed by the actuating member is supported by the second switch as the disc-shaped controller is depressed about its edge, causing the disc-shaped controller to rock about the fulcrum point to actuate the first switch means without substantial horizontal movement of the fulcrum point across the second switch; and processor means responsive to the actuation of the first switch means for formatting a control signal for moving the cursor, and responsive to the actuation of the second switch for formatting a control signal for selecting a computer operational feature; and communications means for transmitting the control signal from the computer controller to the computer means.

12. The computer system as in claim 11 wherein the communications means comprises:

an infrared transmitter connected to the processing means for generating an infrared control signal in response to the control signal output by the processing means;

an infrared receiver connected to the computer means for generating the control signal in response to the infrared control signal; and a infrared communications link between the infrared transmitter and the infrared receiver.

13. The computer system as in claim 11 wherein the first switch means comprises a plurality of first switches arranged in a circular array about the edge of the disc-shaped controller for actuation in response to a depression of the disc-shaped controller around its circumferential edge.

14. The computer system as in claim 13 wherein the first switch means further comprises a plurality of third switches arranged in a circular array concentric with the circular array of first switches.

15. The computer system as in claim 11 wherein the processor means further includes means responsive to the actuation of the second switch for ignoring the actuation of the first switch means while the second switch remains actuated.

16. A system controller, comprising:

a disc-shaped actuator having a circumferential edge and a center;

a plurality of first switches actuated in response to a depression of the disc-shaped actuator around its circumferential edge wherein the disc-shaped actuator rocks about a fulcrum point without substantial horizontal movement to actuate the first switches, the fulcrum point formed by a switch actuating member extending downward from the center of the disc-shaped actuator; and processor means for sequentially scanning the plurality of first switches for actuation and for formatting in response to each scan of the plurality of first switches a data pair signal for output comprising a data code for each of up to two first scanned actuated switches.

17. The system controller as in claim 16 further including a second switch positioned at the center of the disc-shaped actuator, the second switch actuated in response to a depression of the disc-shaped actuator at its center.

18. The system controller as in claim 17 wherein the processor means further includes means responsive to actuation of the second switch for ignoring actuation of any of the plurality of first switches while the second switch remains actuated.

19. A remote control mouse for a computer comprising:
- a housing including transmitter in the housing for sending encoded, wireless signals from the housing to a receiver associated with a computer;
- a first switch disposed within the housing for actuation in response to applied pressure;
- a plurality of second switches disposed within the housing and arrayed around the first switch in a substantially circular pattern with the first switch in a center of the array, each of the plurality of second switches being respectively actuatable in response to pressure applied to the respective switch;
- a cursor controller having a circumferential edge, a center and a fulcrum extending therefrom, the fulcrum being supported in the housing for manual actuation on the first switch for rocking the actuator about the fulcrum to actuate any one or more of the plurality second switches in response to a force applied to a point on the circumference of the actuator, and for actuating the first switch in response to pressure applied to the center of the actuator; and
- a processor in communication with the first switch, the plurality of second switches and the wireless transmitter, the processor including means for encoding the signal sent by the transmitter with a first data code in response to actuation of the first switch and a second data code in response to actuation of one the plurality of second switches.

20. The remote control mouse of claim 19 wherein the data processor further includes means for ignoring actuation of one of the plurality of second switches during actuation of the first switch.

21. The remote control mouse of claim 19 wherein the first switch is actuated upon application of a first pressure and each of the plurality of second switches is respectively actuated with a pressure substantially less than the first pressure.

22. The remote control mouse of claim 19 wherein the second data code indicates to a computer specially programmed for interpreting the first and second data codes to move a pointer on a screen in one of a plurality of predetermined directions determined by which of the plurality of second switches is actuated and wherein first data code indicates to the computer to execute a mouse click process.

23. The remote control mouse of claim 22 wherein actuation of the first switch by depressing the actuator for greater than a predetermined period of time causes the specially programmed computer to execute a click and drag mouse click process on an object displayed on the screen to which the pointer is pointing, whereby subsequent actuation by one or more of the plurality of second switches will indicate to the computer to move the object in the direction indicated by which subsequent actuation.

* * * * *